United States Patent
Reichert

[11] Patent Number: 5,831,040
[45] Date of Patent: Nov. 3, 1998

[54] DISAZO REACTIVE DYES, THEIR PREPARATION AND USE

[75] Inventor: Hans Reichert, Rheinfelden, Germany

[73] Assignee: Ciba Specialty Chemicals Corporation, Tarrytown, N.Y.

[21] Appl. No.: 873,305

[22] Filed: Jun. 11, 1997

[30] Foreign Application Priority Data

Jun. 14, 1996 [CH] Switzerland ............... 1484/96

[51] Int. Cl.⁶ .............. C09B 62/09; C09B 62/475; D06P 1/38
[52] U.S. Cl. ............. 534/637; 534/605; 534/612
[58] Field of Search ............................ 534/637

[56] References Cited

U.S. PATENT DOCUMENTS

| | | | |
|---|---|---|---|
| 4,622,390 | 11/1986 | Meininger et al. | 534/634 |
| 4,908,436 | 3/1990 | Scheibli | 534/637 |
| 4,917,705 | 4/1990 | Mausezahl et al. | 534/637 X |
| 4,990,599 | 2/1991 | Mäusezahl et al. | 534/634 |
| 5,243,034 | 9/1993 | Tappe et al. | 534/637 |
| 5,554,733 | 9/1996 | Tzikas et al. | 534/638 |

FOREIGN PATENT DOCUMENTS

| | | |
|---|---|---|
| 0131545 | 1/1985 | European Pat. Off. |
| 0141367 | 5/1985 | European Pat. Off. |
| 0309405 | 3/1989 | European Pat. Off. |
| 0315585 | 5/1989 | European Pat. Off. |
| 0374758 | 6/1990 | European Pat. Off. |
| 131545 | 11/1985 | Germany ............... 534/637 |

OTHER PUBLICATIONS

Registry Handbook American Chemical Society, Chemical Abstracts Service, p. 6191R4, Compound #180778–23–8 (Apr. 22, 1997).

Registry Handbook American Chemical Society, Chemical Abstracts Service, p. 5152R4, Compound #179233–17–1 (Mar. 4, 1997).

*Primary Examiner*—Fiona T. Powers
*Attorney, Agent, or Firm*—David R. Crichton

[57] ABSTRACT

Compounds of the formula

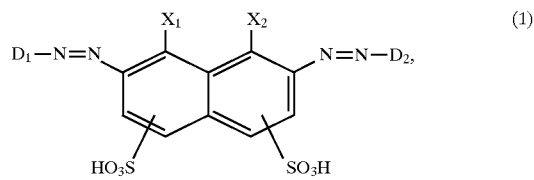

are described in which the variables are as defined in the claims, which compounds are suitable for use as fiber-reactive dyestuffs for dyeing a wide range of fiber materials.

13 Claims, No Drawings

DISAZO REACTIVE DYES, THEIR PREPARATION AND USE

Reactive Dyes, Their Preparation and Use

The present invention relates to novel reactive dyes, processes for their preparation and their use for dyeing or printing textile fibre materials.

The practice of dyeing with reactive dyes has recently led to increased demands on the quality of the dyeings and the economy of the dyeing process. As a result, there is still a need for novel reactive dyes having improved properties, especially in terms of application.

Nowadays the reactive dyes used for dyeing must have sufficient substantivity and simultaneously their unfixed portions must be easy to wash off. Moreover, they should give a high coloristic yield and possess high reactivity, while providing in particular dyeings having high degrees of fixation. The known dyes do not meet these requirements in all their properties.

Accordingly, the object of the present invention is to find novel, improved reactive dyes for dyeing and printing fibre materials which to a great extent possess the qualities characterized above. The novel dyes should be distinguished, in particular, by high degrees of fixation and high stabilities of the fibre/dye bond and furthermore the portions which do not become fixed on the fibre should be easy to wash off. Moreover, they should produce dyeings having good general fastness properties, for example light and wet fastness properties.

It has been found that this object is substantially achieved by means of the novel reactive dyes defined below.

The present invention provides compounds of the formula

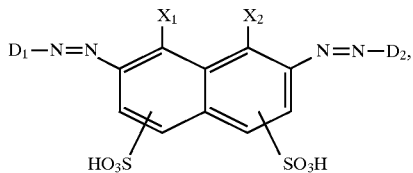

in which one of the variables $X_1$ and $X_2$ is hydroxyl and the other is amino, $D_1$ is a radical of the formula

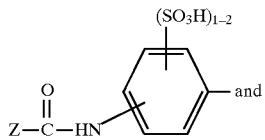

$D_2$ is a radical of the formula

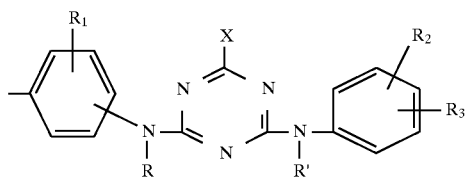

R and R', independently of one another, are each hydrogen or substituted or unsubstituted $C_1$–$C_4$alkyl,
$R_1$ and $R_2$, independently of one another, are each hydrogen, sulfo, $C_1$–$C_4$alkyl, $C_1$–$C_4$alkoxy or halogen,
$R_3$ is a fibre-reactive radical of the formula
—$SO_2$—Y (4a),
—CONH—$(CH_2)_n$—$SO_2$—Y (4b) or
—NH—CO—Z (4c),
X is halogen or substituted or unsubstituted pyridinyl,
Y is vinyl or a radical —$CH_2$—$CH_2$—U and U is a leaving group,
Z is a group —CHT—$CH_2$T or —CT=$CH_2$ and T is bromine or chlorine and n is an integer from 1 to 6.

A substituted or unsubstituted $C_1$–$C_4$alkyl R or R' can be, for example, methyl, ethyl, n- or isopropyl or n-, sec-, tert- or isobutyl, each of which is unsubstituted or substituted, for example by hydroxyl, sulfo, sulfato, carboxyl, cyano, halogen, $C_1$–$C_4$alkoxycarbonyl or carbamoyl.

R and R', independently of one another, are each preferably hydrogen or unsubstituted or hydroxyl-substituted $C_1$–$C_4$alkyl, particularly preferably hydrogen, methyl or ethyl, and most preferably hydrogen.

$R_1$ is preferably hydrogen, methyl, methoxy or sulfo, particularly preferably hydrogen or sulfo and most preferably sulfo.

$R_2$ is preferably hydrogen, sulfo, methyl or methoxy, and particularly preferably hydrogen or methoxy.

T is preferably bromine.

A substituted or unsubstituted pyridinyl radical X is, for example, pyridin-1-yl, 3-carboxypyridin-1-yl or 3-carbamoylpyridin-1-yl. X is preferably halogen, for example fluorine, chlorine or bromine, particularly preferably fluorine or chlorine, and most preferably chlorine.

In a radical —$CH_2$—$CH_2$—U as Y, the leaving group U can be, for example, —Cl, —Br, —F, —$OSO_3$H, —$SSO_3$H, —OCO—$CH_3$ $OPO_3H_2$, —OCO—$C_6H_5$, $OSO_2$—$C_1$–$C_4$alkyl or —$OSO_2$—N($C_1$–$C_4$alkyl)$_2$. Preferably, U is a group of the formula —Cl, —$OSO_3$H, —$SSO_3$H, —OCO—$CH_3$, —OCO—$C_6H_5$ or —$OPO_3H_2$, in particular —Cl or —$OSO_3$H and particularly preferably —$OSO_3$H.

Y is preferably vinyl, β-chloroethyl, β-sulfatoethyl, β-thiosulfatoethyl, β-acetoxyethyl, β-phenoxyethyl or β-phosphatoethyl, and particularly preferably β-sulfatoethyl or vinyl.

n is preferably 2, 3 or 4, particularly preferably 2 or 3, and most preferably 2.

$R_3$ is preferably a fibre-reactive radical of the formula (4a) as defined above.

Radical $D_1$ preferably has the formula

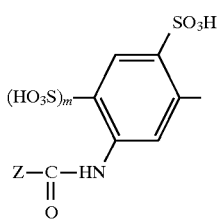

or

in which m is 0 or 1 and Z has the abovementioned meanings and preferences. $D_1$ is particularly preferably a radical of the formula (2a) and most preferably a radical of the formula (2a) in which Z is bromine and m is 0.

Radical $D_2$ preferably has the formula

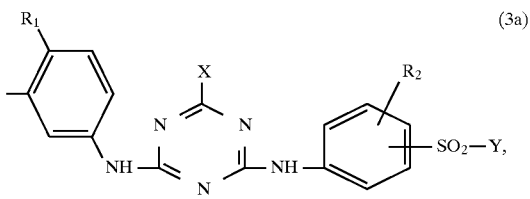
(3a)

in which $R_1$ is hydrogen or preferably sulfo, X is fluorine or preferably chlorine, $R_2$ is hydrogen, methoxy or sulfo, and Y is vinyl or β-sulfatoethylsulfonyl.

A preferred sub-group of compounds according to the invention are those of the formula

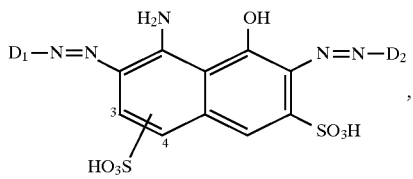
(1a)

in which $D_1$ and $D_2$ have the above-mentioned meanings and preferences and the second sulfo group is bonded to the 4-position or preferably to the 3-position of the 1-amino-8-hydroxy-naphthalene ring.

A further preferred sub-group of compounds according to the invention are those of the formula

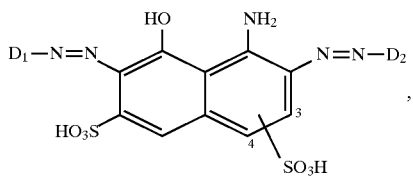
(1b)

in which $D_1$ and $D_2$ have the above-mentioned meanings and preferences and the second sulfo group is bonded to the 4-position or preferably to the 3-position of the 1-amino-8-hydroxy-naphthalene ring.

The compounds of the formula (1) or (1a) or (1b) contain at least three and preferably at least four sulfo groups, each of which is either present in the form of its free acid or preferably as a salt thereof. Examples of suitable salts include alkali metal salts, alkaline earth metal salts or ammonium salts, salts of an organic amine or mixtures thereof. Examples include sodium salts, lithium salts, potassium salts or ammonium salts, the salt of mono-, di- or triethanolamine or sodium/lithium mixed salts or sodium/lithium/ammonium mixed salts.

The present invention furthermore provides a process for preparing reactive dyes of the formula (1), which comprises reacting about 1 mole equivalent each of a compound of the formula $D_1-NH_2$ (5a)
$D_2-NH_2$ (5b)
and

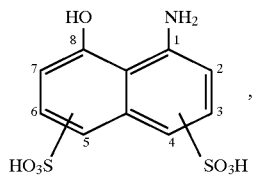
(6)

with one another by diazotization and coupling in any order, $D_1$, $D_2$, $X_1$ and $X_2$ each being as defined above.

Diazotization of the compounds of the formulae (5a) and (5b) is done in the usual manner, for example by diazotizing the compound of the formula (7) in a mineral acid solution, for example in hydrochloric acid solution, with a nitrite, for example sodium nitrite, at low temperature, for example at 0° to 5° C.

Coupling of the diazotized compounds of the formulae (5a) and (5b) with the compound of the formula (6) is likewise done in a manner known per se, advantageously by coupling them in a neutral to slightly acidic medium, for example at pH 3 to 7 and preferably at pH 5 to 6.5, and low temperatures, for example 0° to 30° C., in succession onto the dicoupling coupling component.

The compounds of the formulae (5a), (5b) and (6) are known or can be prepared analogously to known compounds. In the case of introducing a pyridinyl radical X, its introduction is usually carried out after a condensation reaction of the corresponding cyanuric halides.

The dyes according to the invention are fibre-reactive. Fibre-reactive compounds are understood as meaning compounds which are capable of reacting with the hydroxyl groups of cellulose, the amino, carboxyl, hydroxyl or mercapto groups in wool and silk or with the amino and, if present, carboxyl groups of synthetic polyamides to give covalent chemical bonds.

The dyes according to the invention are suitable for dyeing and printing a wide range of materials, such as hydroxyl-containing or nitrogen-containing fibre materials. Examples include silk, leather, wool, polyamide fibres and polyurethanes, and in particular cellulose-containing fibre materials of any type. Examples of such cellulose-containing fibre materials are natural cellulose fibres, such as cotton, linen and hemp, and also cellulose itself and regenerated cellulose. The dyes according to the invention are also suitable for dyeing or printing hydroxyl-containing fibres contained in blended fabrics, for example cotton blends with polyester fibres or polyamide fibres. The dye mixtures according to the invention and the dyes according to the invention are suitable in particular for dyeing or printing cellulose-containing fibre materials. Moreover, they can be used for dyeing or printing natural or synthetic polyamide fibre materials.

The dyes according to the invention can be applied to the fibre material and fixed on the fibre in various ways, in particular in the form of aqueous dye solutions and printing pastes. They are not only suitable for dyeing by the exhaust method but also for dyeing by the pad-dyeing method, according to which the goods are impregnated with aqueous, salt-free or salt-containing dye solutions and the dyes are fixed after an alkali treatment or in the presence of alkali, if desired with exposure to heat, or by storing them at room temperature for several hours. After fixing, the dyeings or prints are thoroughly rinsed with cold and hot water, if desired with the addition of an agent acting as a dispersant and promoting the diffusion of the unfixed portions.

The dyes according to the invention are distinguished by high reactivity, good fixation properties und excellent build-up properties. Accordingly, they can be used for dyeing by the exhaust method at low dyeing temperatures and require only short steaming times in the pad-steam method. The degrees of fixation are high, and the unfixed portions can be easily washed off, the difference between the degree of exhaustion and the degree of fixation being remarkably small, i.e. the soaping loss being very low. The dyes according to the invention and, in particular, the dye mixtures according to the invention are also suitable in particular for printing, especially on cotton, but likewise also for printing nitrogen-containing fibres, for example those made of wool or silk, or blended fabrics containing wool or silk.

The dyeings and prints produced by the dyes according to the invention exhibit a high colour strength and a high stability of the fibre/dye bond, not only in the acid but also in the alkaline region, furthermore good light fastness and excellent wet fastness properties, such as wash, water, sea water, cross-dyeing und perspiration fastness properties, and also good pleating fastness, hot-press fastness and rubbing fastness.

The examples which follow are intended to illustrate the invention. Temperatures are given in degrees centigrade, parts are parts by weight, and percentages are per cent by weight unless stated otherwise. Parts by weight relate to parts by volume as the kilogram relates to the liter.

EXAMPLE 1

(i) 40 parts of 5-(2,3-dibromopropionylamido)aniline-2-sulfonic acid are suspended in 400 parts of water, and 7 parts of sodium nitrite, 50 parts of ice and 30 parts of conc. hydrochloric acid are added, and the resulting mixture is stirred for three hours. Excess nitrite is then destroyed, and a neutral solution of 32 parts of 1-amino-8-naphthol-3,6-disulfonic acid in 300 parts of water is added dropwise at such a rate that the pH does not exceed 2.5. The pH of the reaction mixture is raised to 4 with dilute sodium acetate solution over a period of two hours while allowing the temperature to rise to 15° C. After coupling is complete, reaction mixture 1 is obtained which contains the compound of the following formula:

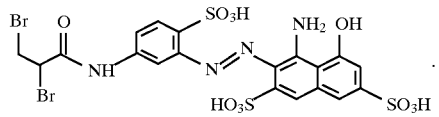

(ii) 19 parts of cyanuric chloride are thoroughly blended for 15 minutes with 50 parts of ice/water and 5 parts of disodium hydrogen phosphate with the addition of a wetting agent. 28 parts of 2-(4-aminophenylsulfonyl)ethyl hydrogen sulfate are added in portions to this suspension. After that, the pH is maintained at 4 for another two hours by addition of dilute sodium hydroxide solution. After condensation is complete, the mixture is warmed to room temperature, the pH is increased to 5.5, and a neutral solution of 17 parts of 2,4-diaminobenzenesulfonic acid in 200 parts of water is added dropwise. Until the end of the reaction, a pH of 5.5 is maintained. The reaction mixture is cooled to 0° C., 7 parts of sodium nitrite, 50 parts of ice and 30 parts of conc. hydrochloric acid are added, and the resulting mixture is vigorously stirred for two hours. Excess nitrite is then destroyed with a small amount of sulfamic acid (reaction mixture 2).

(iii) Reaction mixture 1 is introduced at a pH of 6.5 and an internal temperature of 5° C., and then reaction mixture 2 is slowly added dropwise while maintaining the pH between 6.5 and 7 with dilute sodium hydroxide solution. After coupling is complete, the mixture is subjected to reverse osmosis, and the resulting solution is evaporated in vacuo to give the dye of the formula

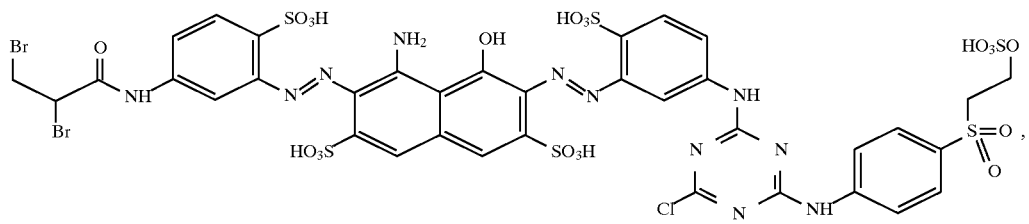

which dyes cotton in a navy hue having good general fastness properties.

EXAMPLE 2

The procedure as described in steps (i) and (ii) of Example 1 is repeated. This is followed by introduction of reaction mixture 1 at a pH of 6.5 and an internal temperature of 5° C. and slow dropwise addition of reaction mixture 2 while maintaining the pH between 6.5 and 7 with dilute sodium hydroxide solution. After coupling is complete, the reaction mixture is heated to an internal temperature of 30° C., stirred at pH 11 for 15 minutes and then neutralized with dilute hydrochloric acid. It is then subjected to reverse osmosis, and the resulting solution is evaporated in vacuo to give the dye of the formula

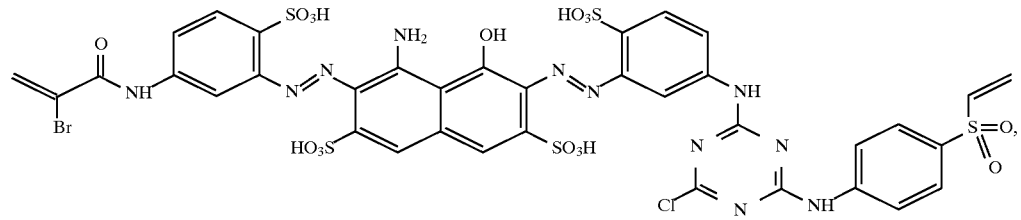

which dyes cotton in a navy hue having good general fastness properties.

EXAMPLE 3

The procedure of Example 1 is repeated, except that, additionally, the reaction mixture obtainable by step (i) of Example 1 is stirred at a temperature of 40° C. and a pH of 9 for 15 minutes to give the dye of the formula

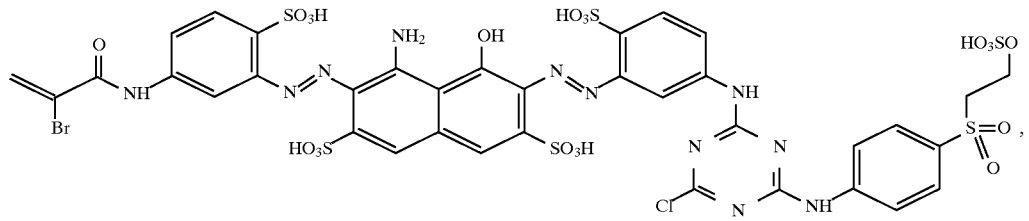

which dyes cotton in a navy hue having good general fastness properties.

EXAMPLES 4–16: The Compounds of the Formula

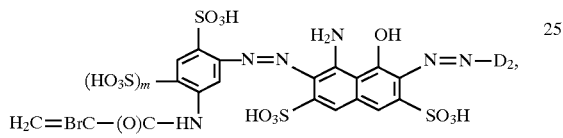

in which $D_2$ is as defined below can be prepared by repeating Example 2.

| Example No. | $D_2$ | m |
|---|---|---|
| 4 | 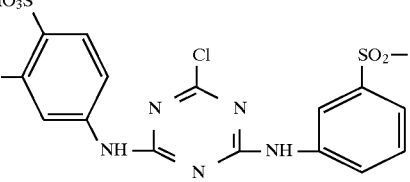 | 0 |
| 5 | 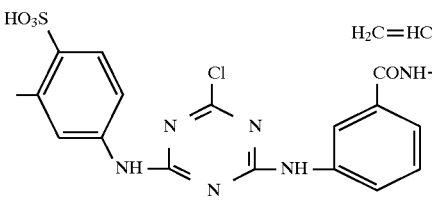 | 0 |
| 6 | 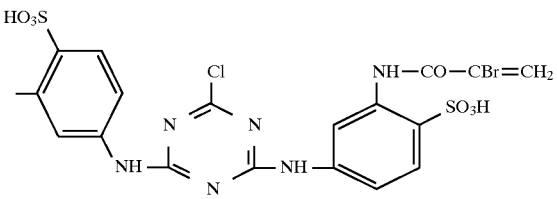 | 0 |
| 7 | 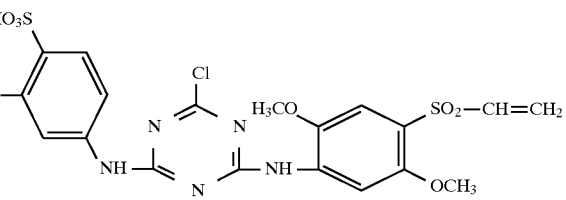 | 0 |

-continued

| Example No. | D₂ | m |
|---|---|---|
| 8 | 4-HO₃S-2-methylphenyl–NH–C(=N–)–N=C(Cl)–N=C(–NH–(2-methoxy-4-(SO₂–CH=CH₂)-5-methylphenyl)) | 0 |
| 9 | 4-HO₃S-2-methylphenyl–NH–C(=N–)–N=C(Cl)–N=C(–NH–(2-methoxy-5-(SO₂–CH=CH₂)phenyl)) | 0 |
| 10 | 4-HO₃S-2-methylphenyl–NH–C(=N–)–N=C(Cl)–N=C(–NH–(4-(SO₂–CH=CH₂)phenyl)) | 1 |
| 11 | 4-HO₃S-2-methylphenyl–NH–C(=N–)–N=C(Cl)–N=C(–NH–(3-(SO₂–CH=CH₂)phenyl)) | 1 |
| 12 | 4-HO₃S-2-methylphenyl–NH–C(=N–)–N=C(Cl)–N=C(–NH–(3-(CONH–(CH₂)₂–SO₂–CH=CH₂)phenyl)) | 1 |
| 13 | 4-HO₃S-2-methylphenyl–NH–C(=N–)–N=C(Cl)–N=C(–NH–(2-(NH–CO–CBr=CH₂)-4-SO₃H-phenyl)) | 1 |
| 14 | 4-HO₃S-2-methylphenyl–NH–C(=N–)–N=C(Cl)–N=C(–NH–(2,5-dimethoxy-4-(SO₂–CH=CH₂)phenyl)) | 1 |
| 15 | 4-HO₃S-2-methylphenyl–NH–C(=N–)–N=C(Cl)–N=C(–NH–(2-methoxy-4-(SO₂–CH=CH₂)-5-methylphenyl)) | 1 |

-continued

| Example No. | D₂ | m |
|---|---|---|
| 16 | (structure: HO₃S-tolyl-NH-C(=N)-N=C(Cl)-N=C(NH)-phenyl(H₃CO)(SO₂—CH=CH₂)) | 1 |

EXAMPLES 17–30: The Compounds of the Formula

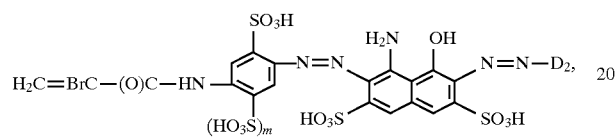

in which $D_2$ is as defined below can be prepared by repeating Example 2.

| Example No. | D₂ | m |
|---|---|---|
| 17 | (structure: HO₃S-methylphenyl-NH-triazine(Cl)-NH-phenyl-SO₂—CH=CH₂, para) | 0 |
| 18 | (structure: HO₃S-methylphenyl-NH-triazine(Cl)-NH-phenyl-SO₂—CH=CH₂, meta) | 0 |
| 19 | (structure: HO₃S-methylphenyl-NH-triazine(Cl)-NH-phenyl with CONH—(CH₂)₂—SO₂—CH=CH₂) | 0 |
| 20 | (structure: HO₃S-methylphenyl-NH-triazine(Cl)-NH-phenyl(SO₃H)(NH—CO—CBr=CH₂)) | 0 |

-continued

| Example No. | D$_2$ | m |
|---|---|---|
| 21 | HO$_3$S–[phenyl(CH$_3$)]–NH–C(=N)–NH–C(Cl)=N– triazine –NH–[phenyl(H$_3$CO, OCH$_3$)]–SO$_2$–CH=CH$_2$ | 0 |
| 22 | HO$_3$S–[phenyl(CH$_3$)]–NH–C(=N)–NH–C(Cl)=N– triazine –NH–[phenyl(H$_3$CO, CH$_3$)]–SO$_2$–CH=CH$_2$ | 0 |
| 23 | HO$_3$S–[phenyl(CH$_3$)]–NH–C(=N)–NH–C(Cl)=N– triazine –NH–[phenyl(H$_3$CO)]–SO$_2$–CH=CH$_2$ | 0 |
| 24 | HO$_3$S–[phenyl(CH$_3$)]–NH–C(=N)–NH–C(Cl)=N– triazine –NH–[phenyl]–SO$_2$–CH=CH$_2$ | 1 |
| 25 | HO$_3$S–[phenyl(CH$_3$)]–NH–C(=N)–NH–C(Cl)=N– triazine –NH–[phenyl]–SO$_2$–CH=CH$_2$ (meta) | 1 |
| 26 | HO$_3$S–[phenyl(CH$_3$)]–NH–C(=N)–NH–C(Cl)=N– triazine –NH–[phenyl]–CONH–(CH$_2$)$_2$–SO$_2$–CH=CH$_2$ | 1 |
| 27 | HO$_3$S–[phenyl(CH$_3$)]–NH–C(=N)–NH–C(Cl)=N– triazine –NH–[phenyl(SO$_3$H)]–NH–CO–CBr=CH$_2$ | 1 |
| 28 | HO$_3$S–[phenyl(CH$_3$)]–NH–C(=N)–NH–C(Cl)=N– triazine –NH–[phenyl(H$_3$CO, OCH$_3$)]–SO$_2$–CH=CH$_2$ | 1 |

-continued

| Example No. | D₂ | m |
|---|---|---|
| 29 | HO₃S–⟨benzene⟩–NH–C(=N)–N=C(Cl)–N–NH–⟨benzene(H₃CO, CH₃)⟩–SO₂–CH=CH₂ | 1 |
| 30 | HO₃S–⟨benzene⟩–NH–C(=N)–N=C(Cl)–N–NH–⟨benzene(H₃CO)⟩–SO₂–CH=CH₂ | 1 |

Dyes of Examples 4 to 30 which in each case contain a group of the formula —NH—CO—CH(Br)—CH₂Br instead of the group of the formula —NH—CO—C(Br)=CH₂, and a group of the formula —SO₂—CH₂CH₂—OSO₃H instead of the group of the formula —SO₂—CH=CH₂, if present in the dyes, and a group of the formula —CONH—(CH₂)₂—SO₂—CH₂CH₂—OSO₃H instead of the group of the formula —CONH—(CH₂)₂—SO₂—CH=CH₂, if present in the dyes, can be obtained by repeating the procedure of Example 1.

Dyes of Examples 4 to 30 which contain a group of the formula —SO₂—CH₂CH₂—OSO₃H instead of the group of the formula —SO₂—CH=CH₂, if present in the dyes, and a group of the formula —CONH—(CH₂)₂—SO₂—CH₂CH₂—OSO₃H instead of the group of the formula —CONH—(CH₂)₂—SO₂—CH=CH₂, if present in the dyes, and, in the radical D₂, a group of the formula —NH—CO—CH(Br)—CH₂Br instead of the group of the formula —NH—CO—C(Br)=CH₂, if present in the radical D₂ of the dyes, can be obtained by repeating the procedure of Example 3.

EXAMPLE 31

(i) 31 parts of 2-(3-amino-4-methoxyphenylsulfonyl) ethyl hydrogen sulfate are made into a slurry with 200 parts of water and 5 parts of disodium hydrogen phosphate at 0° C. with the addition of a wetting agent. The pH of the resulting slurry is brought to 4 with dilute sodium hydroxide solution, and 19 parts of cyanuric chloride are added in portions, and the pH is kept constant at 4 for the duration of the reaction. The mixture is then warmed to 15° C., and a neutral solution of 17 parts of 2,4-diaminobenzenesulfonic acid in 200 parts of water is added dropwise, while raising the pH to 5.5 and maintaining it there. The reaction mixture is cooled to 5° C., 50 parts of ice and 30 parts of conc. hydrochloric acid are added, followed by dropwise addition of 25 parts of 28% sodium nitrite solution, and the resulting mixture is stirred at 5° C. for two hours. After diazotization, excess sodium nitrite is destroyed with sulfamic acid, after which a neutral solution of 32 parts of 1-amino-8-naphthol-3,6-disulfonic acid in 300 parts of water is added dropwise at such a rate that the pH of the reaction mixture remains below 2.5. The pH is then raised to 6.5, first with dilute sodium acetate solution and then with dilute sodium hydroxide solution. This gives reaction mixture 3 which contains the compound of the following formula

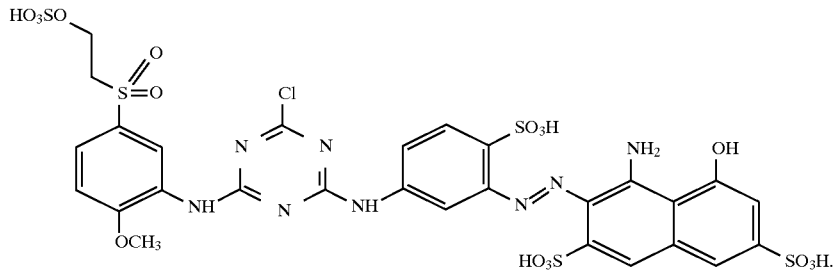

(ii) 40 parts of 5-(2,3-dibromopropionylamido)aniline-2-sulfonic acid are suspended in 400 parts of water, the resulting suspension is diazotized according to Example 1, and the resulting diazonium salt solution is added dropwise at pH 6.5 to reaction mixture 3 prepared above. After the reaction is complete, the reaction mixture is heated to 30° C., stirred at pH 11 for 15 minutes, neutralized and desalted by reverse osmosis. Removal of the solvent under reduced pressure gives the compound of the formula

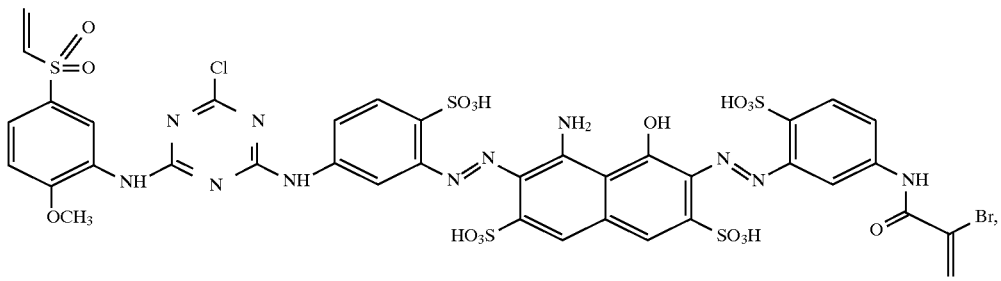

which dyes cotton in deep blue shades having good general fastness properties.

EXAMPLE 32

The procedure as described in Example 31 is repeated, except that in step (ii) of Example 31, the treatment at pH 11, after reaction is complete, is omitted, to give the compound of the formula

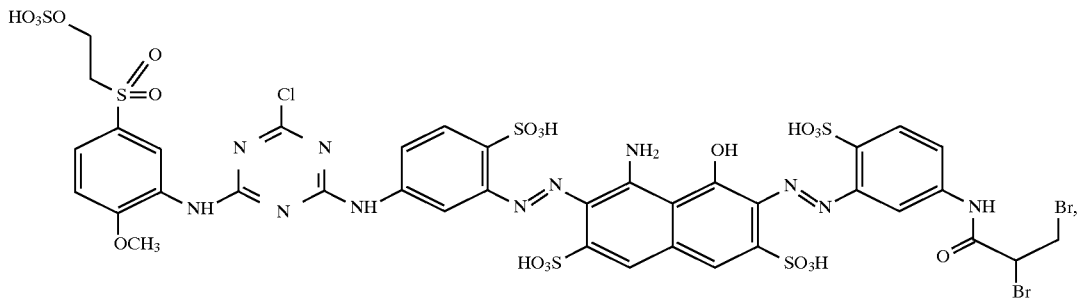

which dyes cotton in deep blue shades having good general fastness properties.

EXAMPLE 33

The procedure as described in Example 31 is repeated, except that, additionally, the reaction mixture obtainable by step (i) of Example 31 is stirred at a temperature of 30° C. and a pH of 11 for 15 minutes, followed by neutralization, and, in step (ii) of Example 31, the treatment at pH 11, after reaction is complete, is omitted, to give the compound of the formula

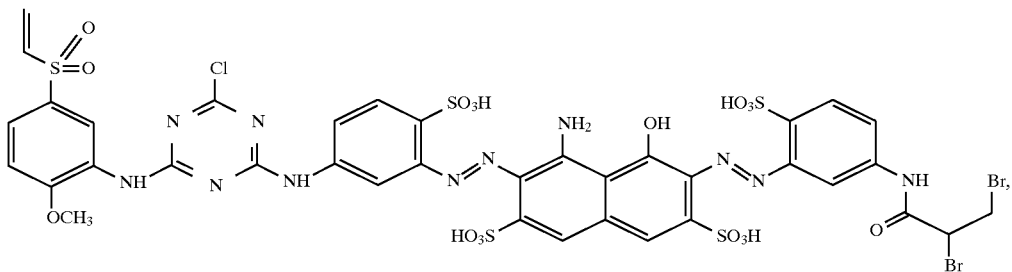

which dyes cotton in deep blue shades having good general fastness properties.

EXAMPLES 34–46: The Compounds of the Formula

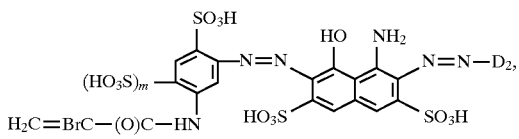

in which $D_2$ is as defined below can be prepared by repeating Example 31.

| Example No. | D$_2$ | m |
|---|---|---|
| 34 | 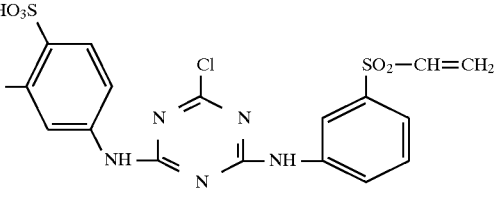 | 0 |
| 35 | 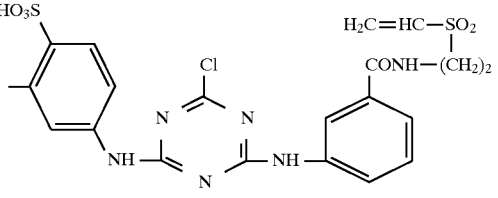 | 0 |
| 36 | 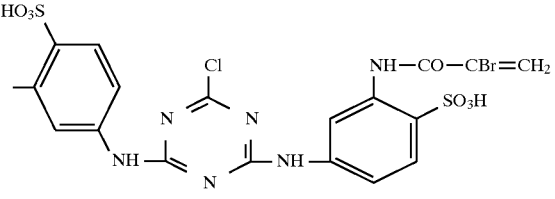 | 0 |
| 37 | 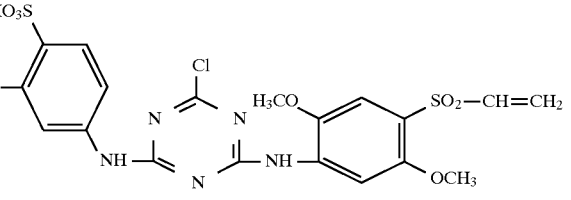 | 0 |
| 38 | 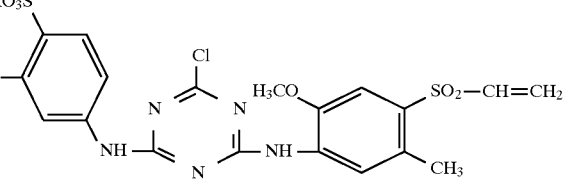 | 0 |
| 39 | 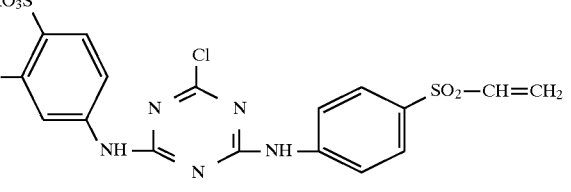 | 0 |
| 40 | 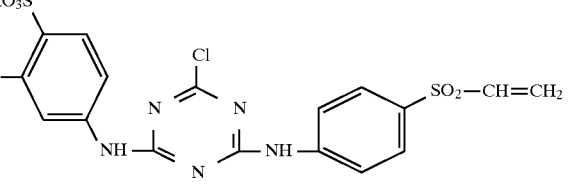 | 1 |
| 41 | 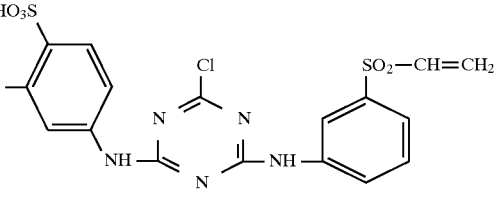 | 1 |

-continued
| Example No. | D₂ | m |
|---|---|---|
| 42 | (structure) | 1 |
| 43 | (structure) | 1 |
| 44 | (structure) | 1 |
| 45 | (structure) | 1 |
| 46 | (structure) | 1 |
EXAMPLES 47–60: The Compounds of the Formula
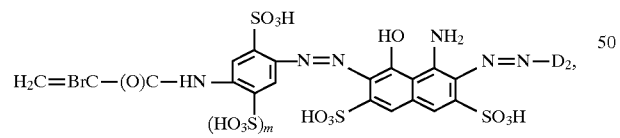
in which $D_2$ is as defined below can be prepared by repeating Example 31.

| Example No. | D₂ | m |
|---|---|---|
| 47 | 4-HO₃S, 2-methylphenyl-NH-[4-chloro-triazinyl]-NH-[4-(SO₂-CH=CH₂)phenyl] | 0 |
| 48 | 4-HO₃S, 3-methylphenyl-NH-[4-chloro-triazinyl]-NH-[3-(SO₂-CH=CH₂)phenyl] | 0 |
| 49 | 4-HO₃S, 3-methylphenyl-NH-[4-chloro-triazinyl]-NH-[3-(CONH-(CH₂)₂-SO₂-CH=CH₂)phenyl] | 0 |
| 50 | 4-HO₃S, 3-methylphenyl-NH-[4-chloro-triazinyl]-NH-[3-(NH-CO-CBr=CH₂), 4-SO₃H phenyl] | 0 |
| 51 | 4-HO₃S, 3-methylphenyl-NH-[4-chloro-triazinyl]-NH-[2-OCH₃, 5-OCH₃, 4-(SO₂-CH=CH₂)phenyl] | 0 |
| 52 | 4-HO₃S, 3-methylphenyl-NH-[4-chloro-triazinyl]-NH-[2-OCH₃, 5-CH₃, 4-(SO₂-CH=CH₂)phenyl] | 0 |
| 53 | 4-HO₃S, 3-methylphenyl-NH-[4-chloro-triazinyl]-NH-[2-OCH₃, 4-(SO₂-CH=CH₂)phenyl] | 0 |
| 54 | 4-HO₃S, 3-methylphenyl-NH-[4-chloro-triazinyl]-NH-[4-(SO₂-CH=CH₂)phenyl] | 1 |

-continued

| Example No. | D₂ | m |
|---|---|---|
| 55 | HO₃S–[phenyl]–NH–C(=N)–N=C(Cl)–N=C(NH–[phenyl]–SO₂–CH=CH₂) (triazine) | 1 |
| 56 | HO₃S–[phenyl]–NH–C(=N)–N=C(Cl)–N=C(NH–[phenyl]–CONH–(CH₂)₂–SO₂–CH=CH₂) (triazine) | 1 |
| 57 | HO₃S–[phenyl]–NH–C(=N)–N=C(Cl)–N=C(NH–[phenyl](NH–CO–CBr=CH₂)(SO₃H)) (triazine) | 1 |
| 58 | HO₃S–[phenyl]–NH–C(=N)–N=C(Cl)–N=C(NH–[phenyl](H₃CO)(OCH₃)(SO₂–CH=CH₂)) (triazine) | 1 |
| 59 | HO₃S–[phenyl]–NH–C(=N)–N=C(Cl)–N=C(NH–[phenyl](H₃CO)(CH₃)(SO₂–CH=CH₂)) (triazine) | 1 |
| 60 | HO₃S–[phenyl]–NH–C(=N)–N=C(Cl)–N=C(NH–[phenyl](H₃CO)(SO₂–CH=CH₂)) (triazine) | 1 |

Dyes of Examples 34 to 60 which in each case contain a group of the formula —NH—CO—CH(Br)—CH₂Br instead of the group of the formula —NH—CO—C(Br)=CH₂, and a group of the formula —SO₂—CH₂CH₂—OSO₃H instead of the group of the formula —SO₂—CH=CH₂, if present in the dyes, and a group of the formula —CONH—(CH₂)₂—SO₂—CH₂CH₂—OSO₃H instead of the group of the formula —CONH—(CH₂)₂—SO₂—CH=CH₂, if present in the dyes, can be obtained by repeating the procedure of Example 32.

Dyes of Examples 34 to 60 which in each case contain a group of the formula —NH—CO—CH(Br)—CH₂Br instead of the group of the formula —NH—CO—C(Br)=CH₂ bonded to the meta or para position relative to the azo bridge can be obtained by repeating the procedure of Example 33.

Dyeing Procedure I 2 parts of the dye obtained according to Example 1 are dissolved in 400 parts of water, and 1500 parts of a solution containing 53 g of sodium chloride per liter are added. This dyeing bath is entered at 40° C. with 100 parts of cotton fabric. After 45 minutes, 100 parts of a solution containing 16 g of sodium hydroxide and 20 g of calcined sodium carbonate per liter are added. The temperature of the dyeing bath is maintained at 40° C. for another 45 minutes. The dyed goods are then rinsed, soaped at the boil with a nonionic detergent for a quarter of an hour, rinsed again and dried.

Dyeing Procedure II 2 parts of the reactive dye obtained according to Example 2 are dissolved in 400 parts of water, and 1500 parts of a solution containing 53 g of sodium chloride per liter are added. This dyeing bath is entered at 35° C. with 100 parts of a cotton fabric. After 20 minutes, 100 parts of a solution containing 16 g of sodium hydroxide and 20 g of calcined sodium carbonate per liter are added. The temperature of the dyeing bath is maintained at 35° C. for another 15 minutes. This is followed by increasing the temperature to 60° C. over a period of 20 minutes. The temperature is maintained at 60° C. for another 35 minutes. The dyed goods are then rinsed, soaped at the boil with a nonionic detergent for a quarter of an hour, rinsed again and dried.

Dyeing Procedure III 8 parts of the reactive dye obtained according to Example 3 are dissolved in 400 parts of water, and 1400 parts of a solution containing 100 g of sodium sulfate per liter are added. This dyeing bath is entered at 25° C. with 100 parts of a cotton fabric. After 10 minutes, 200 parts of a solution containing 150 g of trisodium phosphate per liter are added. This is followed by increasing the temperature of the dyeing bath to 60° C. over a period of 10 minutes. The temperature is maintained at 60° C. for another 90 minutes. The dyed goods are then rinsed, soaped at the boil with a nonionic detergent for a quarter of an hour, rinsed again and dried.

Dyeing Procedure IV 4 parts of the reactive dye obtained according to Example 1 are dissolved in 50 parts of water, and 50 parts of a solution containing 5 g of sodium hydroxide and 20 g of calcined sodium carbonate per liter are added. The resulting solution is used to pad a cotton fabric such that its weight increases by 70%, and the cotton fabric is wound onto a batching roller. It is stored in this form at room temperature for 3 hours. The dyed goods are then rinsed, soaped at the boil with a nonionic detergent for a quarter of an hour, rinsed again and dried.

Dyeing Procedure V 6 parts of the reactive dye obtained according to Example 2 are dissolved in 50 parts of water, and 50 parts of a solution containing 16 g of sodium hydroxide and 0.04 liter of water glass (38°Bé) per liter are added. The resulting solution is used to pad a cotton fabric such that its weight increases by 70%, and the cotton fabric is then wound onto a batching roller. It is stored in this form at room temperature for 10 hours. The dyed goods are then rinsed, soaped at the boil with a nonionic detergent for a quarter of an hour, rinsed again and dried.

Dyeing Procedure VI 2 parts of the reactive dye obtained according to Example 3 are dissolved in 100 parts of water with the addition of 0.5 part of sodium m-nitrobenzenesulfonate. The resulting solution is used to impregnate a cotton fabric such that its weight increases by 75%, and the fabric is then dried. It is then impregnated with a warm solution at 20° C. containing 4 g of sodium hydroxide and 300 g of sodium chloride per liter and squeezed off to a liquor pick-up of 75%. The dyeing is steamed at 100° to 102° C. for 30 seconds, rinsed, soaped in a 0.3% boiling solution of a nonionic detergent for a quarter of an hour, rinsed again and dried.

Dyeing Procedure VII 0.1 part of the dye obtained according to Example 1 is dissolved in 200 parts of deionized water, and 0.5 part of Glauber salt, 0.1 part of a levelling agent and 0.5 part of sodium acetate are added. The pH is then adjusted to 5.5 with 80% acetic acid. The dyeing bath is heated at 50° C. for 10 minutes, followed by addition of 10 parts of a woollen fabric. It is then heated to 100° C. over a period of about 50 minutes, and dyeing is carried out at this temperature for 60 minutes. The dyeing bath is then allowed to cool to 90° C., and the dyed goods are removed. The woollen fabric is rinsed with hot and cold water, spin-dried and dried to give a brilliant dyeing exhibiting excellent light and wet fastness properties.

Printing Procedure I 3 parts of the reactive dye obtained according to Example 1 are sprinkled with rapid stirring into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The printing paste thus obtained is used to print a cotton fabric, and the printed fabric obtained is dried and steamed at 102° C. in saturated steam for 2 minutes. The printed fabric is then rinsed, and, if desired, soaped at the boil, rinsed again and then dried.

Printing Procedure II 5 parts of the reactive dye obtained according to Example 2 are sprinkled with rapid stirring into 100 parts of a stock thickener containing 50 parts of 5% sodium alginate thickener, 36.5 parts of water, 10 parts of urea, 1 part of sodium m-nitrobenzenesulfonate and 2.5 parts of sodium hydrogen carbonate. The printing paste thus obtained, whose stability meets the technical requirements, is used to print a cotton fabric, and the printed fabric obtained is dried and steamed at 102° C. in saturated steam for 8 minutes. The printed fabric is then rinsed, and, if desired, soaped at the boil, rinsed again and then dried.

What is claimed is:

1. A compound of the formula

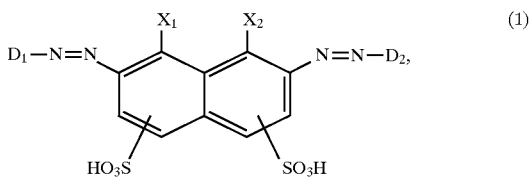

in which one of the variables $X_1$ and $X_2$ is hydroxyl and the other is amino, $D_1$ is a radical of the formula

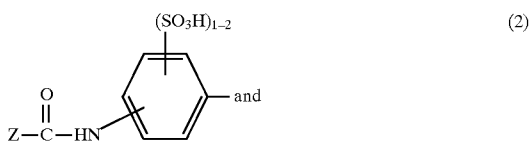

$D_2$ is a radical of the formula

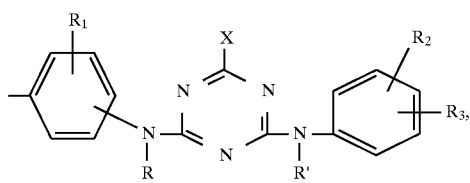   (3)

R and R', independently of one another, are each hydrogen or substituted or unsubstituted $C_1$–$C_4$alkyl, $R_1$ and $R_2$, independently of one another, are each hydrogen, sulfo, $C_1$–$C_4$alkyl, $C_1$–$C_4$alkoxy or halogen, $R_3$ is a fibre-reactive radical of the formula
—$SO_2$—Y (4a),
—CONH—$(CH_2)$n—$SO_2$—Y (4b) or
—NH—CO—Z (4c), X is halogen or substituted or unsubstituted pyridinyl, Y is vinyl or a radical —$CH_2$—$CH_2$—U and U is a leaving group, Z is a group —CHT—$CH_2$T or —CT=$CH_2$ and T is bromine or chlorine and n is an integer from 1 to 6.

2. A compound according to claim 1, wherein
X is fluorine or chlorine and
R and R', independently of one another, are each hydrogen or $C_1$–$C_4$alkyl.

3. A compound according to claim 1, wherein $R_1$ and $R_2$, independently of one another, are each hydrogen, methyl, methoxy or sulfo.

4. A compound according to claim 1, wherein $R_3$ is a fibre-reactive radical of the formula (4a) as defined in claim 1.

5. A compound according to claim 1, wherein $D_1$ is a radical of the formula

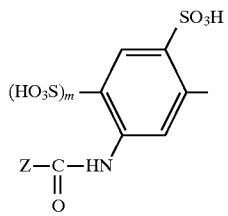   (2a)

or

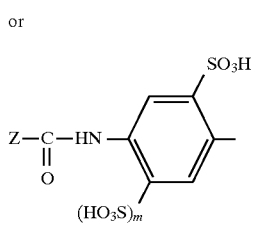   (2b)

in which m is 0 or 1 and Z is as defined in claim 1.

6. A compound according to claim 1, wherein $D_2$ is a radical of the formula

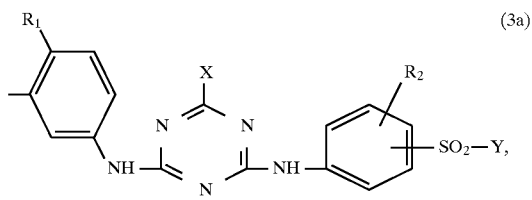   (3a)

in which $R_1$ is hydrogen or sulfo,
X is fluorine or chlorine,
$R_2$ is hydrogen, methoxy or sulfo, and
Y is vinyl or β-sulfatoethylsulfonyl.

7. A compound according to claim 1 of the formula

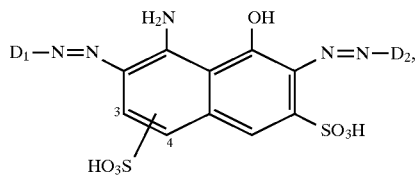   (1a)

in which $D_1$ and $D_2$ are as defined in claim 1 and the second sulfo group is bonded to the 4-position or to the 3-position of the 1-amino-8-hydroxynaphthalene ring.

8. A compound according to claim 1 of the formula

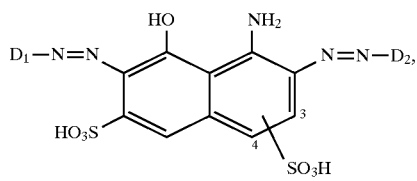   (1b)

in which $D_1$ and $D_2$ are as defined in claim 1 and the second sulfo group is bonded to the 4-position or to the 3-position of the 1-amino-8-hydroxynaphthalene ring.

9. A compound according to claim 7 of the formula (1a), in which the second sulfo group is bonded to the 3-position of the 1-amino-8-hydroxynaphthalene ring and $D_1$ is a radical of the formula

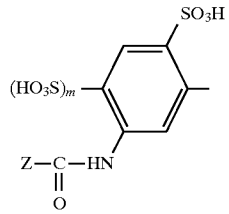   (2a)

in which m is 0 or 1 and Z is a group —CHT—$CH_2$T or —CT=$CH_2$ and T is bromine or chlorine, and $D_2$ is a radical of the formula

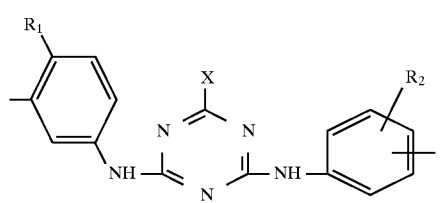   (3a)

in which $R_1$ is hydrogen or sulfo,
X is fluorine or chlorine,
$R_2$ is hydrogen, methoxy or sulfo, and
Y is vinyl or β-sulfatoethylsulfonyl.

10. A compound according to claim 8 of the formula (1b), in which the second sulfo group is bonded to the 3-position of the 1-amino-8-hydroxynaphthalene ring and $D_1$ is a radical of the formula

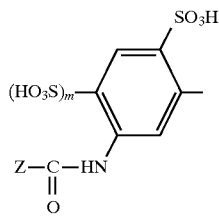 (2a)

in which m is 0 or 1 and Z is a group —CHT—CH$_2$T or —CT=CH$_2$ and T is bromine or chlorine, and $D_2$ is a radical of the formula

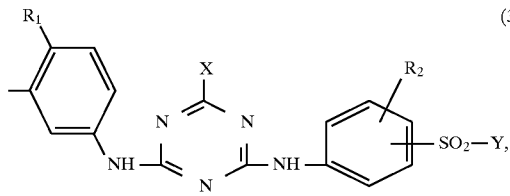 (3a)

in which $R_1$ is hydrogen or sulfo,
X is fluorine or chlorine,
$R_2$ is hydrogen, methoxy or sulfo, and
Y is vinyl or β-sulfatoethylsulfonyl.

11. A process for preparing a compound of the formula (1) according to claim 1, which comprises reacting about 1 mole equivalent each of a compound of the formula $D_1$—NH$_2$, (5a)
$D_2$—NH$_2$ (5b)
and

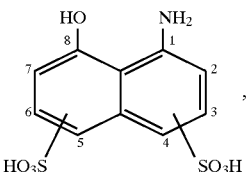 (6)

with one another by diazotization and coupling in any order, $D_1$, $D_2$, $X_1$ and $X_2$ each being as defined in claim 1.

12. A process for dyeing or printing hydroxyl-containing or nitrogen-containing fibre material which comprises applying to said fibre material a tinctorially effective amount of a compound of the formula (1) according to claim 1.

13. A process according to claim 12 wherein said fibre material is cellulose-containing fibre material.

* * * * *